US 6,339,736 B1

(12) United States Patent
Moskowitz et al.

(10) Patent No.: US 6,339,736 B1
(45) Date of Patent: Jan. 15, 2002

(54) SYSTEM AND METHOD FOR THE DISTRIBUTION OF AUTOMOTIVE SERVICES

(75) Inventors: Paul Andrew Moskowitz, Yorktown Heights; Philip Shi-Lung Yu, Chappaqua; Stephen J. Boies, Mahopac, all of NY (US); Sam Dinkin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/539,897

(22) Filed: Mar. 31, 2000

(51) Int. Cl.[7] ............................ G01S 5/00; G01S 13/00; G06F 7/00; G06F 17/00; G06F 19/00
(52) U.S. Cl. .............. 701/29; 701/29-33; 701/200-215; 705/13; 705/22; 705/29; 705/28; 705/400; 705/413; 340/988; 340/990; 340/992; 340/995; 340/993; 342/357.13; 342/457
(58) Field of Search .............................. 701/33, 29, 30, 701/31, 32, 200-215; 705/28, 13, 400, 22, 413, 29; 340/990, 988, 995, 992, 993; 342/457, 357.13

(56) References Cited

U.S. PATENT DOCUMENTS

| 4,128,005 | A | | 12/1978 | Arnston et al. ........... 701/117.3 |
| 5,107,428 | A | | 4/1992 | Bethencourt et al. ......... 701/25 |
| 5,313,388 | A | | 5/1994 | Cortis .......................... 701/25 |
| 5,334,974 | A | * | 8/1994 | Simms et al. ................ 340/990 |
| 5,400,018 | A | | 3/1995 | Scholl et al. ........... 340/825.54 |
| 5,442,553 | A | | 8/1995 | Parrillo ........................ 701/25 |
| 5,528,698 | A | * | 6/1996 | Kamei et al. ................ 382/100 |
| 5,631,832 | A | * | 5/1997 | Hagenbuch ............ 364/424.04 |
| 5,648,755 | A | | 7/1997 | Yagihashi .................... 340/439 |
| 5,652,911 | A | | 7/1997 | Van Venrooy et al. ....... 395/800 |
| 5,714,948 | A | * | 2/1998 | Farmakis .................... 340/961 |
| 5,758,300 | A | | 5/1998 | Abe ............................. 701/33 |
| 5,781,101 | A | * | 7/1998 | Stephen et al. ......... 340/286.02 |
| 5,809,437 | A | | 9/1998 | Breed .......................... 701/29 |
| 5,815,071 | A | | 9/1998 | Doyle ......................... 340/439 |
| RE35,920 | E | * | 10/1998 | Sorden ....................... 342/457 |
| 5,848,373 | A | * | 12/1998 | Delorme et al. ............. 701/200 |
| 6,078,850 | A | * | 7/2000 | Kane et al. ................... 701/29 |
| 6,140,956 | A | * | 10/2000 | Hillman et al. ......... 342/357.02 |
| 6,167,255 | A | * | 12/2000 | Kennedy, III et al. ....... 455/414 |

* cited by examiner

Primary Examiner—William A. Cuchlinski, Jr.
Assistant Examiner—Ronnie Mancho
(74) Attorney, Agent, or Firm—Stephen C. Kaufman, Esq.; McGinn & Gibb, PLLC

(57) ABSTRACT

A system for the distribution of services, includes a computer device within a vehicle, a vehicle monitoring system coupled to the computer device, a communication system coupled to the computer device for outputting a signal with vehicle monitoring system data, and a remote service center computer device for receiving a signal with vehicle monitoring system data. The method of distributing vehicle maintenance services includes monitoring, by a sensor, a maintenance parameter of the vehicle, communicating the service parameter to a controller, the controller triggering a communications device, sending, by the communications device, a message to a service center, and dispatching, by the service center, a service vehicle based on receiving the signal. In another method, a method of providing service to a vehicle, includes subscribing, by a vehicle owner, to a service, performing the service based on one of an as-needed basis and automatically at any of a home of the vehicle owner, an office of the vehicle owner, and a location specified by the vehicle owner, and billing the vehicle owner for the service rendered to the vehicle.

31 Claims, 4 Drawing Sheets

SYSTEM AND METHOD FOR THE DISTRIBUTION OF AUTOMOTIVE SERVICES

BACKGROUND OF THE INVENTION

1. Field of the Invention

The present invention generally relates to a vehicle, and more particularly to a vehicle including a system for coordinating the home delivery of automotive services.

2. Description of the Related Art

The increasing decentralization of population centers has created a society in the United States (and many of the industrialized nations) in which people must either spend a great deal of time traveling to obtain services or pay others to perform such services. For example, home newspaper delivery is popular in suburban environments because the nearest newsstand may be five miles distant from one's home. The decentralization of homes, work places, shopping and service locations requires much time to be spent traveling in an automobile.

However, regarding the most basic automotive services, there is no equivalent to anything analogous to newspaper home delivery. The purchase of gasoline and the refueling of the vehicle still requires an inconvenient stop at a service station. Emergency services may be provided (e.g. if a car runs out of fuel on a highway, a service vehicle may be dispatched by "AAA" or the like), but at great cost to the customer. The automotive services industry is geared toward providing normal services at their own service locations or toward providing expensive emergency services at remote locations.

While normal home services may include newspaper delivery, septic system cleaning, lawn mowing and maintenance, and the delivery of home heating oil, there is no service that will deliver gasoline to your car at home or at another predetermined location (e.g., office, etc.). This requires drivers to spend time searching for and driving to sources of fuel unnecessarily. This same problem exists in practically all forms of automobile maintenance (e.g., oil changes, checking and maintaining tire pressure, checking and replacement of transmission fluids, and the like).

Computer technology for providing information and application functions to automotive vehicles is becoming pervasive. For example, vehicles are being outfitted with computers that contain display devices, particularly warning sensors for indicating a low fuel condition, a door ajar condition, temperature, maintenance reminders, and so forth (e.g., see U.S. patent application Ser. No. 09/311,277, entitled "Information System for Mobile Users", and filed May 14, 1999 and U.S. Ser. No. 09/357,840, entitled "System and Method for (Network) Vehicle Diagnostics and Health Monitoring", filed Jul. 21, 1999, both incorporated herein by reference).

While the above-described vehicle technology is widespread, none of the conventional systems and methods recognizes (let alone addresses) the advantages of applying computer technology to vehicles to reduce the amount of time searching for and driving to automotive fuel and/or maintenance sources.

SUMMARY OF THE INVENTION

In view of the foregoing and other problems, disadvantages, and drawbacks of the conventional methods and structures, an object of the present invention is to provide a structure and method for monitoring the status of vehicle fuel and fluid levels and providing automotive services at the owner's residence or vehicle location.

In a first aspect of the present invention, a system for the home delivery of automotive services is provided, thereby reducing the need to travel and pay high prices at service stations. As mentioned above, current technologies are capable of monitoring the electronic control units (ECUs) of an automobile using an on-board client computer device and to provide the information necessary for an electronic signal to be communicated to a service provider at a central location.

In an exemplary embodiment, a sensor monitors the level of fuel (e.g., diesel, gasoline, etc.) in the tank of a person's vehicle and uses a communications system to inform a remote server of the level of gas in the tank. The remote server determines that the level of gasoline is low and dispatches a service vehicle to the location of the person's vehicle to fill the tank. The service can be done at a time when the vehicle is parked, for example, in a parking lot at a workplace or at night at a customer's residence.

In addition to fuel, other automobile maintenance conditions (e.g., fluid and oil levels, battery charge level, tire pressure, etc.) may be automatically monitored and service performed without requiring the vehicle owner to seek out and visit a service station.

The decision-making apparatus for deciding when servicing is required can be located in the vehicle (e.g., an in-vehicle computer monitor) or alternatively by a computer located at a central service area. A communications device, also known as a telecom device, located in the vehicle preferably sends a "request for service" message or a monitoring result depending upon where the service decision is made.

Additionally, a location coordinate can be sent to the service center to guide a service provider using a navigational system to the parked vehicle.

Variations of the embodiment may include a telephone communication from the service center to a customer following the receipt of, for example, a low-fuel level reading, service provided upon request or automatically, and service dependent upon location. For example, if a vehicle is outside of an economically feasible servicing radius, then service may not be provided.

Invoicing in such a system preferably occurs as service is provided and could be performed via automatic debit of an account number, by paper invoice, or based upon some other formula.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
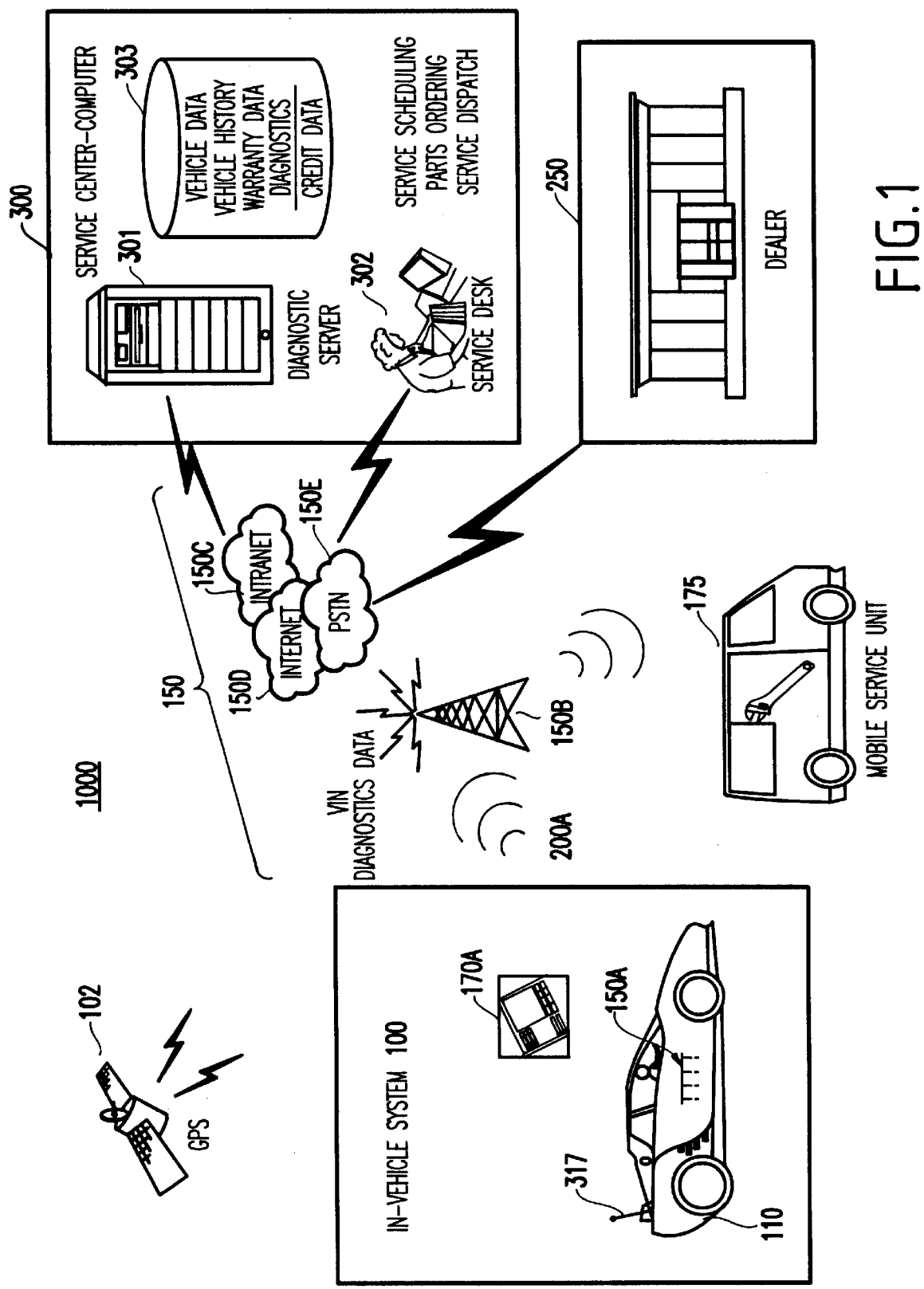
FIG. 1 illustrates an upper level environment in which the present invention is utilized.

Referring now to the drawings, and more particularly to FIGS. 1–4, there is shown a preferred embodiment of the method and structure according to the present invention.

FIG. 1 illustrates an upper level environment of a system according to the present invention.

As shown in FIG. 1, the system 1000 includes an in-vehicle electronic system 100 comprising an in-vehicle computing system 170A having diagnostics capability by means of a vehicle bus adapter connected to the vehicle bus 150A, a communication link 150 (e.g., via a wireless phone system 150B or the like) for communicating vehicle identification information such as the number (VIN), registration information including car model, year, color, and license plate number, diagnostic data, position data obtained by means of a GPS satellite system 102, and the like. Such a link may be interfaced with an Intranet 150C, the Internet 150D, or a public (or private) switched telephone network (PSTN) 150E.

Further shown is a mobile service unit (service vehicle) 175 for providing services for the vehicle based on a signal received over the communication link 150.

A remote service center 300 is provided with a computer that includes a diagnostic server 301, a service desk 302 and a data repository 303. The service desk 302 schedules services, orders parts, and dispatches service through the mobile service unit 175. The center is remote in that the vehicle to receive service is not brought to the center. The vehicle may be located at a location of the customer or owner, e.g. owner's home, place of business, or other location specified by the owner. It is to be understood that the term "owner" refers to a person legally in possession of the vehicle or anyone authorized by the owner to be in legal possession of the vehicle, e.g. an employee, relative, or friend of the owner or a lessor of the vehicle. The system eliminates the need to bring the vehicle to a service station or dealer.

Further, a dealer 250 is shown for communication through the PSTN 150E to the remote service center 300. The dealer may be called upon by the service center to provide parts for maintenance.

Figure 2:
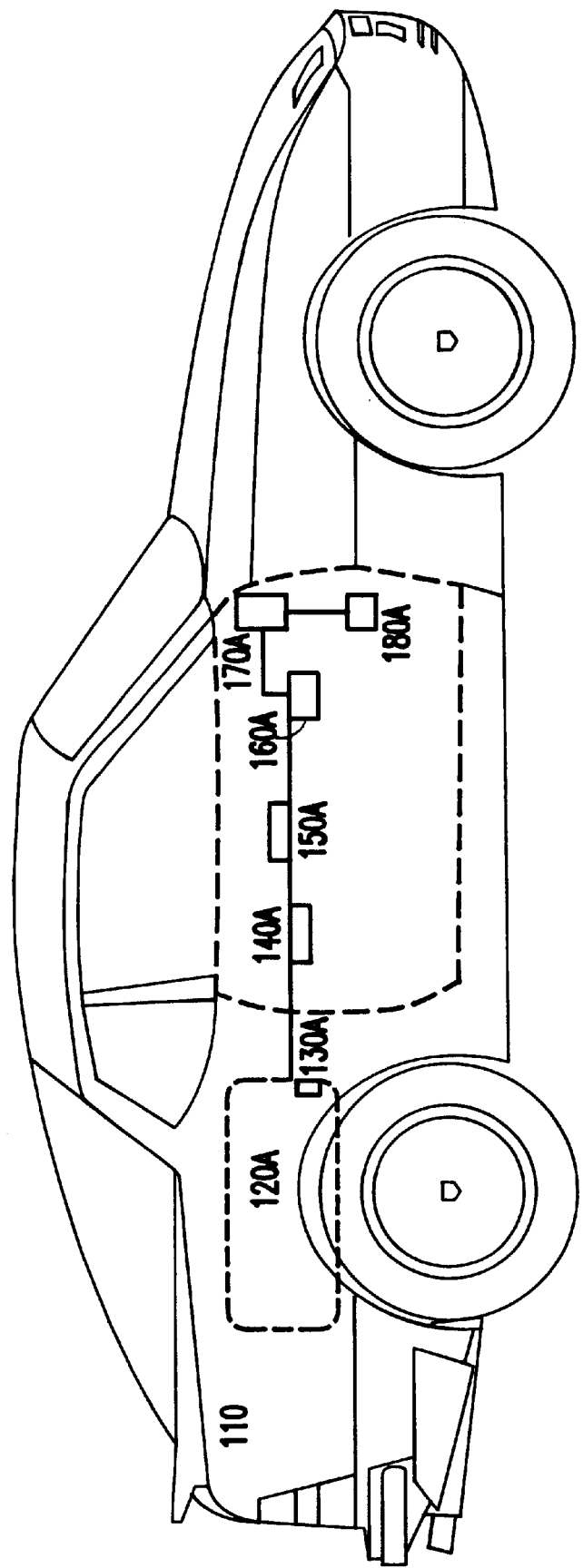
FIG. 2 is a schematic diagram showing a vehicle including a device for detecting the levels of fuel according to a preferred embodiment of the invention.
Figure 3:
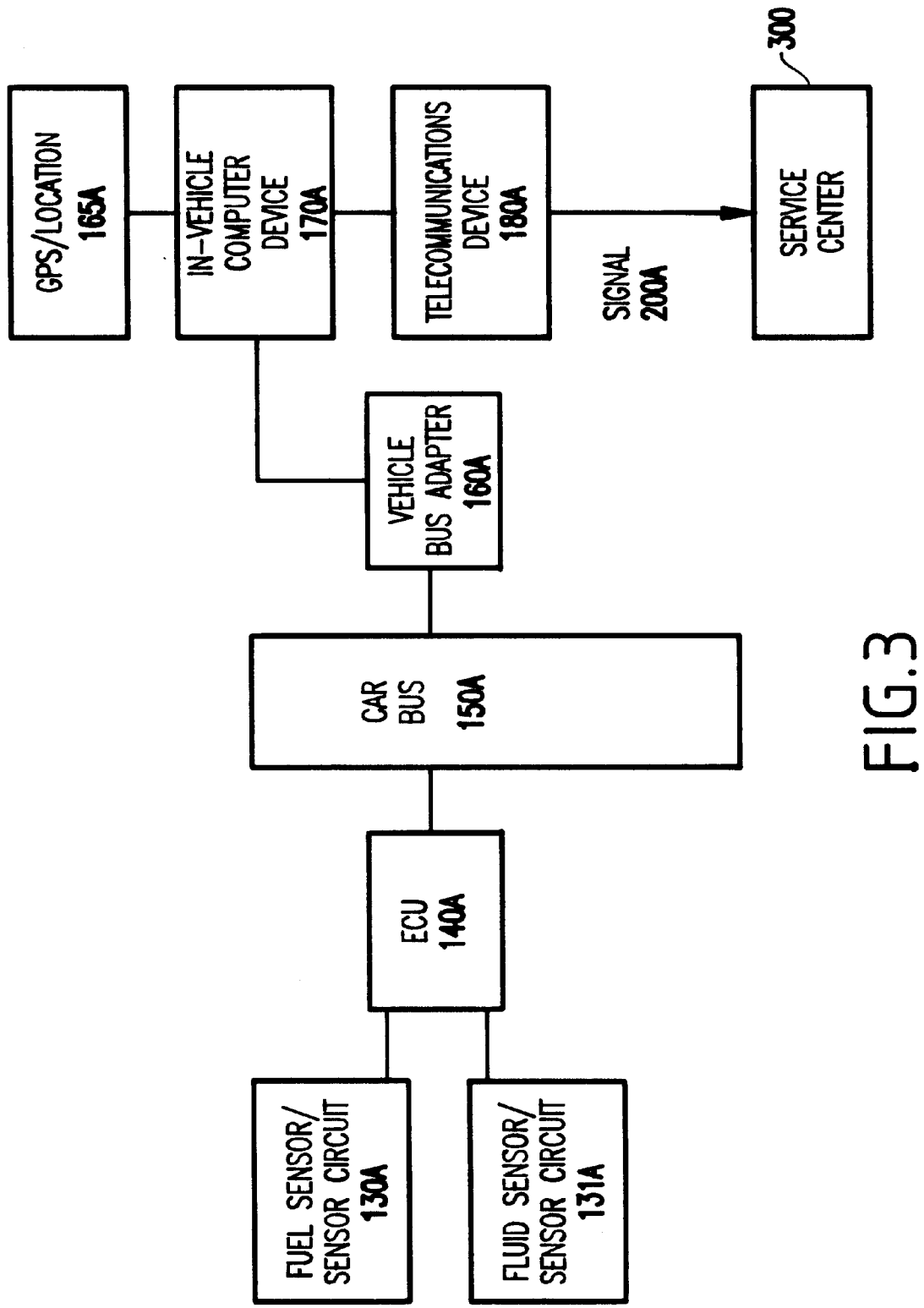
FIG. 3 is a block diagram showing a schematic of the vehicle's upper level architecture including the device for detecting fuel levels according to the present invention.

Turning to FIGS. 2 and 3, a more detailed view of the vehicle system 100 is shown according to the present invention.

The in-vehicle system 100 is shown for use with a vehicle 110. System 100 includes at least one sensor device 130A for monitoring, for example, a level of a fuel tank 120A. The sensor is connected to an electronic control unit 140A which transforms the sensor signal into a standard digital format output. The ECU output is connected to the vehicle bus 150A. Diagnostic Trouble Codes (DTCs) and vehicle parameters are monitored over the vehicle bus. These codes cause indicator lamps to illuminate under specified conditions. These codes and parameters may be used to infer the fuel level by monitoring the parameters reported by the electronic control unit (ECU) 140A over the car or vehicle bus 150A. Other sensors may be used to monitor a level and/or condition of engine oil, a level and/or condition of the vehicle's transmission fluid, etc. Also provided is a vehicle bus adapter 160A, an in-vehicle computing device 170A, and a communication device 180A for sending a message to a service center regarding fuel levels, and other conditions, etc.

This vehicle system 100 includes at least one sensor (or sensor circuit) 130A, and more preferably a plurality of sensors located at different positions in the vehicle for detecting a condition requiring service. The sensor 130A which detects a predetermined condition located inside of the vehicle 110 can be formed of known and commercially available components such as a float device in a fuel tank 120A.

Additionally, referring to FIG. 3, the system 100 includes a source of information on vehicle location 165A which may be obtained through the use of the Global Positioning System (GPS) satellite system 102. This data may be conveyed to the in-vehicle computing device and included in the set of data transmitted by the telecommunications (telecom) device. Alternatively, positioning data may be obtained directly from the wireless network based upon cell location or from a GPS detector embedded in the telecom device.

The vehicle bus may be one of several standards, such as the SAE J1850 bus found in many North American-manufactured vehicles such as the Chrysler Concorde® or the Controller Area Network (CAN) bus found in European-manufactured vehicles such as the Mercedes Benz® ML320. The vehicle bus adapter may an OBD-II Interface Module manufactured by the Vetronix Corporation of Santa Barbara, Calif. for the J1850 bus or the CAN Card 2 with CANOE software manufactured by Vector Informatik GmbH of Stuttgart, Germany for the CAN bus. The in-vehicle computing device may be one described in the above-referenced U.S. patent application Ser. No. 09/357, 840 or the AutoPC by the Clarion Corporation of Gardena, Calif. The telecommunications device may be a mobile phone such as the Motorola i1000+ operating over the Nextel® wireless system. Positioning data may be obtained and sent to the computing device through the use of apparatus manufactured by the DeLorme Corporation of Yarmouth, Me. or Trimble Navigation Corporation of Sunnyvale, Calif.

Referring again to FIG. 3, the in-vehicle computing device communicates to the telecom output 180A, the level of fluid detected. The levels and conditions of a plurality of serviceable fluids may be reported (e.g., any one or more of fuel level, oil level or pressure and condition, engine coolant level, transmission fluid level, washer fluid level, and even tire pressure). Additional information on the location and registration information of the car may be reported. The registration information would be pre-entered into the in-vehicle computing device. The in-vehicle computing device is a controller that instructs the telecom device 180A to send a signal 200A (e.g., cell phone, or radio and the like) to the service center 300. The in-vehicle computing device (or controller) may be an embedded computer with processor and memory or an ECU which triggers the telecom device to send a phone call to the service center.

Turning to FIG. 1 for details of the service center, the fluid level is input to the diagnostic server, shown in FIG. 1. If the level is below a threshold level, the diagnostic server 301 instructs the service desk 302 to dispatch the mobile service unit 175 to the customer. The service desk may be an automated function operating within the same computing system housing the diagnostic server. Alternatively, the reception of a call from the telecom device without data may be used to indicate that service is required. Such service comprises the routine maintenance of the vehicle such as the replenishing of fluids, battery replacement, tire inflation, etc.

Figure 4:
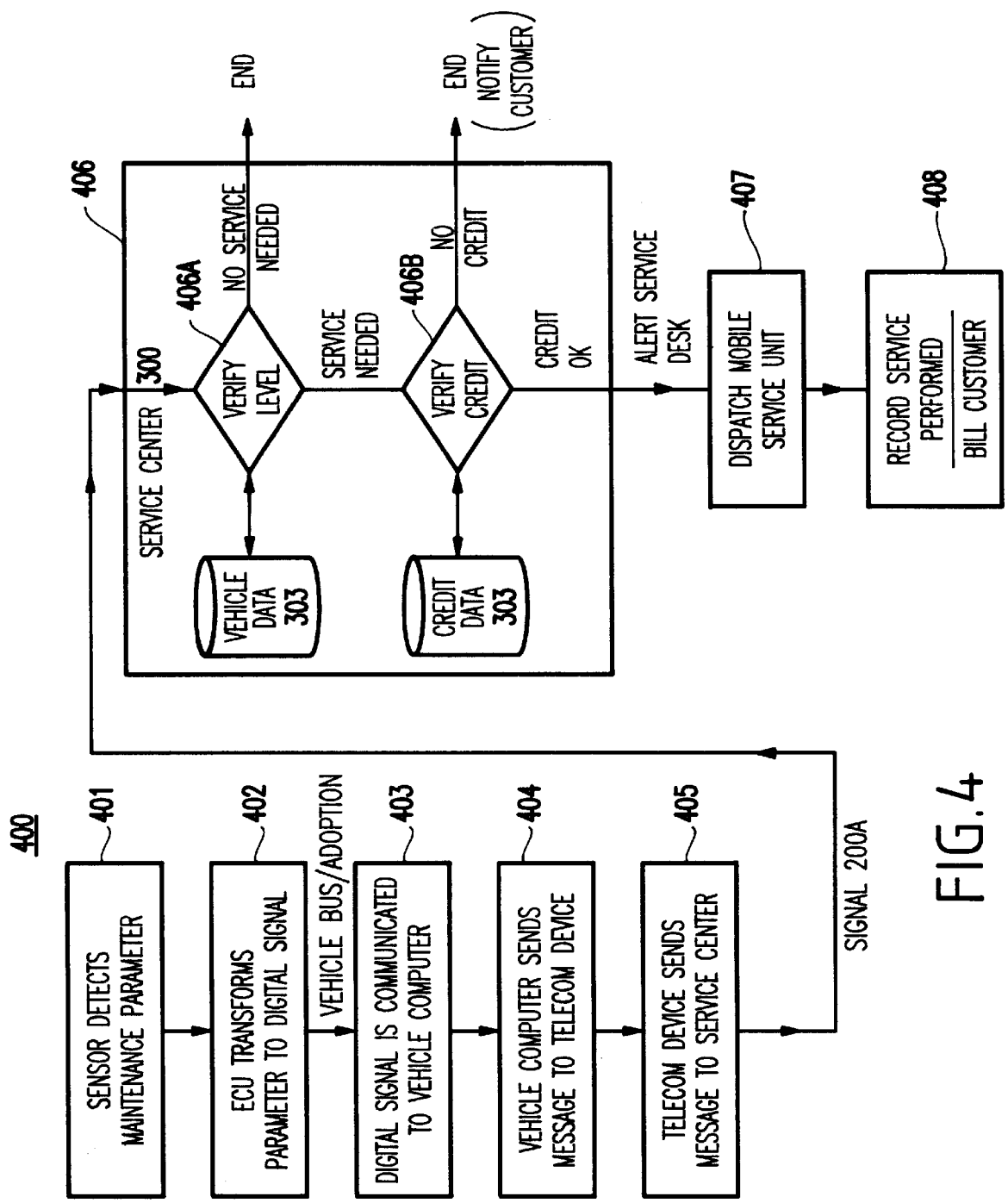
FIG. 4 is a flow diagram illustrating a method for monitoring and delivering according to the present invention.

FIG. 4 illustrates a method 400 for monitoring a vehicle maintenance fluid level using a preferred embodiment of the invention.

In step 401 of the method 400, the sensor monitors a vehicle maintenance parameter. The output of the sensor is connected to an ECU where in step 402 the ECU outputs a signal containing the maintenance parameter or a Diagnostic Trouble Code in standard digital format.

In step 403, the digital maintenance parameter in digital format, indicating e.g., the fuel or fluid level, is communicated over the vehicle bus to the vehicle computer via the vehicle bus adapter. If a predetermined level (e.g., fuel pressure low) or condition (e.g., maintenance is required based on conditions sensed by the sensor circuits such as high-conductivity of oil), then the in-vehicle computer sends a message to the telecom device in step 404. Alternatively, the value of the fuel level or another parameter such as oil conductivity is reported to the service center where the decision on maintenance is made. In another alternative embodiment, the sensor of step 401 is connected directly to a controller, which may be an ECU replacing the computer of steps 403 and 404. The controller triggers the telecom device to call or send a message to the service center.

In step 405, the telecom device transmits a signal 200A to the service center 300 and in step 406, the service center computer receives the signal 200A requesting service and processes it, comparing the data with values in the vehicle data store 303, authorizing the dispatch of a service vehicle to the customer vehicle 407.

If a high fuel or fluid level is noted, no service is dispatched. If problems are found (e.g., credit), the transaction is denied. A bill or notice of denial may also be forwarded to the customer (e.g., via mail, facsimile, automatic credit deduction, telephone call, etc.). Subsequent to the service, the service is recorded, charges are calculated and the customer is billed in step 408.

In an alternative embodiment, the customer subscribes to the service without using automated in-vehicle monitoring, in which case, steps 402 through 406A are omitted. The service vehicle is dispatched on a regular basis to the location of the vehicle, e.g. owners home, to replenish fuel and fluids.

Many types of sensors may be employed including any one or more of electrical resistance, capacitance, current, voltage, and/or force/pressure sensors and may be used in systems for monitoring conditions within a vehicle and are known in the art. Such sensor components and configurations are described in, for example, U.S. Pat. Nos. 5,648,755, 5,443,553, 5,107,428, 5,313,388, 5,758,300, 5,652,911, 4,128,005, 5,809,437 5,815,071, and 5,400,018, each incorporated herein by reference.

The diminution of levels below a certain pre-programmed setting causes a change in the electrical characteristics of the sensor 130A. The sensor's electrical characteristics are monitored by the electrical control unit (ECU) 140A, which reports a maintenance code (parameter or DTC) over the car bus, such as a Society of Automotive Engineers (SAE) J1850 communication bus, or a Controller Area Network (CAN) bus. The bus provides the parameter or code to a vehicle bus adapter 160A which provides information to the in-vehicle computing system 170A. Alternatively, in a simplified embodiment of the system shown in FIGS. 2 an 3, the fuel level is reported by the sensor 130A directly to a controller, taking the place of the in-vehicle computing device 170A, which triggers the telecommunications device 180A to place a call indicating that service is needed.

While the invention has been described in terms of several preferred embodiments, those skilled in the art will recognize that the invention can be practiced with modification within the spirit and scope of the appended claims.

What is claimed is:

1. A system for distribution of routine maintenance services to a vehicle, comprising:
   a computer device within said vehicle;
   a vehicle monitoring system coupled to said computer device;
   a communication system coupled to said computer device for outputting a signal representing vehicle monitoring system data;
   a remote service center computer device for receiving said signal with said vehicle monitoring system data; and
   a service vehicle for being dispatched by said remote service center to said vehicle,
   wherein said service vehicle provides routine maintenance services to said vehicle, and
   wherein said vehicle is selectively located at any of a vehicle owner's home, a vehicle owner's office, and a vehicle owner's specified location.

2. The system as claimed in claim 1, wherein said remote service center computer analyzes said vehicle monitoring system data and provides an output.

3. The system as claimed in claim 2, wherein a service is provided to said vehicle based on said output.

4. The system of claim 1 wherein said vehicle monitoring system comprises at least one sensor for sensing a maintenance parameter.

5. The system as claimed in claim 4, wherein a plurality of sensors, for sensing maintenance parameters, are provided at predetermined positions of said vehicle.

6. The system as claimed in claim 1, wherein said system comprises an electronic control unit (ECU) for processing said output signal from said at least one sensor.

7. The system as claimed in claim 1, wherein said system comprises a vehicle communication bus for carrying data to said computer device.

8. The system as claimed in claim 4, wherein said maintenance parameter comprises at least one of fuel level, engine coolant level, washer fluid level, oil level, oil condition, oil pressure, transmission fluid level, tire air pressure, battery voltage, battery current.

9. The system as claimed in claim 4, wherein at least one sensor for sensing a maintenance parameter outputs a fuel level in a vehicle fuel tank.

10. The system according to claim 7, wherein said bus comprises one of a Society of Automotive Engineers (SAE) J1850 and a Controller Area Network bus.

11. A system for distribution of routine maintenance services to a vehicle, comprising:
    a vehicle monitoring system;
    a controller coupled to said monitoring system;
    a communication system coupled to said controller for outputting a signal;
    a remote service center for receiving said signal; and
    a service vehicle for being dispatched by said remote service center to said vehicle,
    wherein said service vehicle provides routine maintenance services to said vehicle, and
    wherein said vehicle is selectively located at any of a vehicle owner's home, a vehicle owner's office, and a vehicle owner's specified location.

12. The system of claim 11, wherein said controller comprises one of a computer device and an electronic control unit (ECU).

13. The system of claim 11, wherein said remote service center comprises a computer for receiving said signal.

14. The system as claimed in claim 13, wherein said remote service center computer analyzes said vehicle monitoring system data and provides an output.

15. The system as claimed in claim 14, wherein a service is provided to said vehicle based on said output.

16. The system of claim 11, wherein said vehicle monitoring system comprises at least one sensor for sensing a maintenance parameter.

17. The system as claimed in claim 16, wherein a plurality of sensors, for sensing maintenance parameters, are provided at predetermined positions of said vehicle.

18. The system as claimed in claim 16, wherein said system comprises an electronic control unit (ECU) for processing said output signal from said at least one sensor.

19. The system as claimed in claim 11, wherein said system comprises a vehicle communication bus for carrying data to said controller.

20. The system as claimed in claim 16, wherein said maintenance parameter comprises at least one of fuel level, engine coolant level, washer fluid level, oil level, oil condition, oil pressure, transmission fluid level, tire air pressure, battery voltage, and battery current.

21. The system as claimed in claim 16, wherein at least one sensor for sensing a maintenance parameter outputs a fuel level in a vehicle fuel tank.

22. The system according to claim 19, wherein said bus comprises one of a Society of Automotive Engineers (SAE) J1850 and a Controller Area Network bus.

23. The system of claim 11, wherein said message contains a maintenance parameter, a vehicle location, and a vehicle registration information.

24. A method for providing routine maintenance service, comprising:

monitoring, by a sensor, a maintenance parameter of said vehicle;

communicating said service parameter to a controller, said controller triggering a communications device;

sending, by said communications device, a message to a service center; and dispatching, by said service center, a service vehicle based on receiving said signal, wherein said service vehicle provides routine maintenance service to said vehicle a location selected by a vehicle owner.

25. The method according to claim 24, further comprising:

performing, by said service vehicle maintenance, for which a need is indicated by said service parameter.

26. A method of providing routine maintenance service to a vehicle owner, comprising:

subscribing, by a vehicle owner, to a routine maintenance service;

performing said routine maintenance service based on one of an as-needed basis and automatically on a vehicle selectively located at any of a home of said vehicle owner, an office of said vehicle owner, and a location specified by said vehicle owner; and billing said vehicle owner for said routine maintenance service rendered to said vehicle.

27. The method according to claim 26, further comprising:

monitoring the vehicle for at least one of a maintenance condition and a service condition.

28. The method according to claim 26, wherein said performing of said routine maintenance service includes at least one of replenishing said vehicle with necessary components and performing maintenance on said vehicle.

29. A system for providing routine maintenance service to a vehicle owner, comprising:

means for performing a routine maintenance service for a vehicle based on one of an as-needed basis and automatically, said vehicle being under a service subscription by said vehicle owner, and said vehicle being selectively located at any of a home of said vehicle owner, an office of said vehicle owner, and a location specified by said vehicle owner; and means for billing said vehicle owner for said routine maintenance service rendered to said vehicle.

30. The system according to claim 29, further comprising:

means for monitoring said vehicle for at least one of a maintenance condition and a service condition.

31. The system according to claim 29, wherein said means for performing said routine maintenance service includes at least one of means for replenishing said vehicle with necessary components and means for performing maintenance on said vehicle.

* * * * *